(12) United States Patent
Locke et al.

(10) Patent No.: US 9,127,739 B2
(45) Date of Patent: Sep. 8, 2015

(54) MULTICOMPONENT POLYMERIC STRUCTURE FOR ADDRESSING NOISE, VIBRATION AND HARSHNESS IN STRUCTURES

(75) Inventors: Ralph J. Locke, Fort Myers, FL (US); Dudley J. Primeaux, Elgin, TX (US)

(73) Assignee: DCT Holdings LLC, Bingham Farms, MI (US)

( * ) Notice: Subject to any disclaimer, the term of this patent is extended or adjusted under 35 U.S.C. 154(b) by 478 days.

(21) Appl. No.: 12/338,422

(22) Filed: Dec. 18, 2008

(65) Prior Publication Data

US 2009/0220759 A1 Sep. 3, 2009

Related U.S. Application Data

(60) Provisional application No. 61/015,430, filed on Dec. 20, 2007.

(51) Int. Cl.
*B32B 7/02* (2006.01)
*F16F 3/093* (2006.01)
*B32B 25/08* (2006.01)
*B32B 25/14* (2006.01)
*B32B 27/40* (2006.01)

(52) U.S. Cl.
CPC ............. *F16F 3/093* (2013.01); *B32B 25/08* (2013.01); *B32B 25/14* (2013.01); *B32B 27/40* (2013.01); *Y10T 428/24983* (2015.01)

(58) Field of Classification Search
USPC ........................................................ 428/217
See application file for complete search history.

(56) References Cited

U.S. PATENT DOCUMENTS

| | | | |
|---|---|---|---|
| 3,394,164 A | 7/1968 | McClellan | |
| 4,705,814 A | 11/1987 | Grigsby, Jr. | |
| 4,883,717 A * | 11/1989 | Kitamura et al. | 428/458 |
| 5,162,388 A | 11/1992 | Primeau, II | |
| 5,227,592 A * | 7/1993 | Kosters et al. | 181/207 |
| 5,712,038 A | 1/1998 | Yamazaki et al. | |

(Continued)

FOREIGN PATENT DOCUMENTS

JP       2001002749 A  *  1/2001
KR       20-0287905 Y1    2/2002

OTHER PUBLICATIONS

Machine English Translation of JP_2001/002749_A, Saeki, Kazunori, Flexible Polyurethane Slab Foam and Its Production, Jan. 9, 2001, JPO, whole document.*

(Continued)

*Primary Examiner* — Tahseen N Khan
(74) *Attorney, Agent, or Firm* — Young Basile Hanlon & MacFarlane

(57) ABSTRACT

A method and composition for damping vibration of a substrate as well as a construction configured to achieve dampened vibration transmission. The construction includes a substrate configured to transmit NVH associated vibration in at least one frequency range. The construction also includes a first polymeric layer overlying at least a portion of the substrate element. The first polymeric layer comprises at least one material having elastomeric characteristics in a Tg range between +10 to −10° C. as outlined in ASTM E1640-00 and a hardness of between 5 and 25 as measured with the Shore A methodology outlined in ASTM D2240-00 and a second polymeric layer having elastomeric characteristics less than those exhibited by the first layer.

5 Claims, 2 Drawing Sheets

(56) References Cited

U.S. PATENT DOCUMENTS

| | | | |
|---|---|---|---|
| 5,731,397 A | 3/1998 | Primeau, II | |
| 6,291,019 B1 | 9/2001 | Locke | |
| 2002/0001678 A1* | 1/2002 | Locke et al. | 427/421 |
| 2003/0220464 A1* | 11/2003 | Wu et al. | 528/61 |
| 2004/0262808 A1* | 12/2004 | Wu et al. | 264/250 |
| 2006/0189413 A1* | 8/2006 | Boehm et al. | 473/371 |
| 2006/0252577 A1* | 11/2006 | Sullivan et al. | 473/354 |
| 2006/0260267 A1* | 11/2006 | Hagen et al. | 52/745.19 |
| 2007/0082754 A1* | 4/2007 | Sullivan et al. | 473/371 |
| 2007/0129172 A1* | 6/2007 | Cavallaro | 473/371 |
| 2007/0264462 A1* | 11/2007 | Covelli et al. | 428/43 |
| 2009/0048357 A1 | 2/2009 | Yasui et al. | |

OTHER PUBLICATIONS

Korean Intellectual Property Office, International Search Report and Written Opinion of the International Searching Authority.

\* cited by examiner

MULTICOMPONENT POLYMERIC STRUCTURE FOR ADDRESSING NOISE, VIBRATION AND HARSHNESS IN STRUCTURES

The present invention pertains to methods and compositions suitable for addressing and/or modifying acoustic and transmissive qualities in various constructions including, but not limited to, automotive vehicles. More particularly, the present invention is directed to a method, composition, and structure suitable for modifying transmissive qualities in a substrate. More particularly, the present invention relates to a method for damping vibration of the substrate and a composition therefore that can be used in the automotive industry.

In recent years, the desire to reduce and restrict the perception or occurrence of transmitted vibrations in a variety of substrates has increased. In various industries including, but not limited to, industries such as automotive, aerospace, overland transport industries, and the like, significant research and development has been directed to improving noise, vibration, and harshness (NVH) characteristics of various structures.

These methods have included placement of vibration damping structures such as moldings and/or pads at various locations on a substrate including but not limited to junctions, seams, or the like, in order to halt or minimize transmission of vibrations that are typically classified and perceived as NVH. Several drawbacks exist to the placement of moldings and/or pads. These include drawbacks pertaining to precise tolerances and fit required at the junctions and seams as well as wear and degradation of such molding and pad materials over time. Furthermore, such interposed moldings or pads necessitate time-consuming assembly to properly and securely attach these items to the respective areas.

Other solutions include spraying epoxy or water-born systems in liquid form onto structures at some point during the assembly process. For example, in the automotive industry epoxy or water-born liquid systems can be applied to bodies in white. These materials typically required curing operations in order to solidify. Until cured, they remain wet on the surface of the structure. Because they remain wet, they are subject to running and dripping, raising the potential for contamination of paint, e-coat systems, or the like. The application of various rapid curing compositions has also been proposed. These systems typically replace the plastisol or epoxy-based coating sprayed unilaterally on the substrate structure with a rapid curing material such as certain specific polyurea compositions. While these compositions address various assembly-related problems and challenges, the proposed polyurea coating systems do not adequately address the damping of noise, vibration, and harshness in various situations.

SUMMARY

Disclosed herein is a method and composition for damping vibration of a substrate as well as a construction configured to achieve dampened vibration transmission. The construction includes a substrate configured to transmit NVH associated vibration in at least one frequency range. The construction also includes a first polymeric layer overlying at least a portion of the substrate element. The first polymeric layer comprises at least one material having elastomeric characteristics in a Tg range between +10 to −10 C as outlined in ASTM E1640-00 and a hardness of between 5 and 25 as measured with the Shore A methodology outlined in ASTM D2240-00.

Alternatively, the construct also includes a second polymeric layer in overlying relationship to at least a portion of the first polymeric layer in which the second layer exhibits greater rigidity than the first layer and is composed of at least one polymeric material that possesses lower elastomeric characteristics than the polymeric material present in the first polymeric layer. In certain non-limiting applications, it is contemplated that the second layer will have a hardness value between 75 and 95 Shore A.

Also disclosed is a multi-component polymeric structure for reducing NVH transmissive characteristics on a substrate that comprises, in layered relationship, at least one polymeric substance having at least one polymeric component exhibiting enhanced elastomeric qualities and at least one polymeric substance exhibiting elastomeric characteristics lower than those of the first layer. The polymeric component of the first layer can be a blend of at least one alkylene vinyl acetate polymer with at least one halogenated vinyl polymer having an alkylene backbone. The polymeric component of the second layer can include a polymeric compound formed from a first component that consists essentially of a polymer and/or a blend of polymers present in an amount sufficient to impart a predetermined amount of tensile strength, hardness, and flexibility, and a second component composed of an isocyanate quasi-prepolymer based on modified MDI and high molecular weight polyether polyol having an isocyanate content between about 10 and 60% and a 2,4 prime-isomer content of less than 10%. In various particular embodiments it is contemplated that an isocyanate content between about 22% and 32% can be employed.

DESCRIPTIONS OF DRAWINGS

DESCRIPTION

Figure 1:
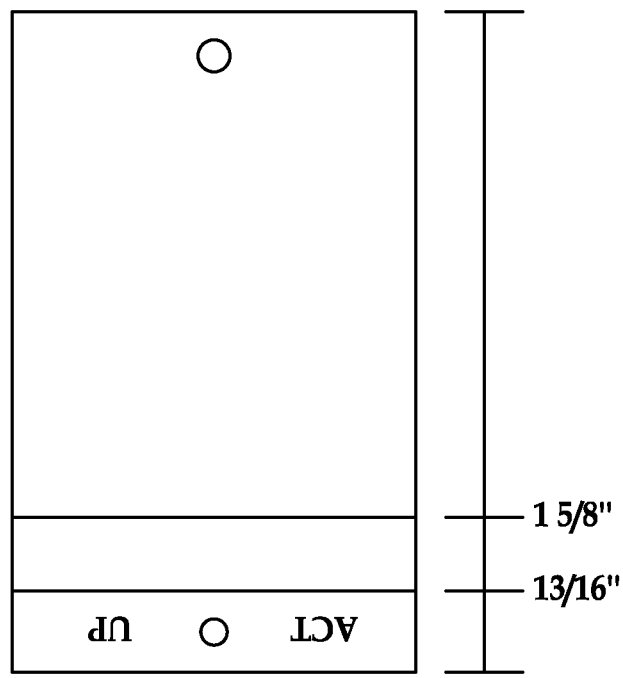
FIG. 1 is a plan view of a test panel for determining noise damping characteristics.

Disclosed herein is a composition suitable for modifying acoustic and/or vibration transmission characteristics of a construct, particularly those acoustic transmissive characteristics identified as noise, vibration, and harshness (NVH). Also disclosed is a substrate modified to address such transmissive characteristics as well as a construct produced including the modified substrate. Also disclosed herein is a method for applying the acoustic modification material to a substrate to address acoustic or vibration transmissive characteristics.

As used herein, the term "noise, vibration, and harshness" (NVH) is a term given to the field of measuring and modifying the noise and vibration characteristics of specific construction such as, but not limited to, transportation vehicles. The term is applied in the automotive industry. However, it is considered to be part of a broader field of acoustic and/or vibration transmissive characteristics. In the present disclosure, the efficacy of the composition and modified construct will be expressed in terms of the effect on NVH. However, the present disclosure is to be construed more broadly to encompass modification of acoustic and/or vibration transmissive characteristics that fall outside the definition of NVH where this is applicable or suitable.

NVH generally includes a constellation of vibration-derived events perceived by vehicle occupants. It is to be understood that the vibration(s) damped by the method of the present invention may be audible (sound/noise) vibrations, tactile vibrations, and/or non-tactile vibrations (eg. "body boom"). Where desired or required, the method and composition of the present invention may be especially suitable for damping vibrations within audible frequencies. However it is also to be considered within the purview of this invention to damp vibrations that are in whole or in part in the inaudible range. This may be of particular significance in situations where vibrations in the inaudible range transmit or translate the vibration as it passes through the surrounding structure.

The component "harshness" in the NVH definition is generally considered a term that is subjective to the individual. However, noise and vibration can be articulated by various measurable standards that will be described subsequently. Generally, NVH in various applications such as in passenger vehicles has two component parts, interior NVH is directed to the noises and vibrations experienced by occupants within a cabin or confined space defined by the given vehicle. Exterior NVH is concerned with noises radiated by a vehicle, particularly during use. The vibration(s) damped by the method and construct disclosed herein can be audible (sound/noise) vibrations, tactile vibrations, and/or non-tactile vibrations (eg. "body boom").

The present disclosure is directed to a construct or construction that includes at least one substrate element configured to modify acoustic and/or vibration transmissive characteristics of the substrate element and associated construct. The term "substrate element" as used herein is defined to include any suitable device or can be an individual element or unit in an associated construct. The substrate element can be composed of any suitable material including, but not limited to, metal, carbon graphite composites, fiberglass, polycarbonates, ABS, and other structural polymeric materials. The substrate element and associated construct can be suitable for use in any desired industry. By way of non-limiting example, it is contemplated that the substrate element can be a structural or non-structural component in various products associated with marine watercraft, consumer electronics and appliances, automotive vehicles, aerospace, defense and various other industries, etc. It is contemplated that the substrate element can be a component part of a larger construct or where desired or required, the substrate, the substrate element can be an integrated unitary device.

The substrate element will typically include at least one outer surface region and at least one inner surface region. The surface region of the substrate element can have any suitable topography as defined by the end-use application of the substrate element. Thus, it is contemplated that the surface region of the substrate element can be a flat planar surface or can be any suitable geometric configuration as desired or required. Where desired or required, at least one surface region can include suitable coatings or surface materials as are suitable for the application of the substrate element. Such coatings or surface treatment materials can include passivating agents, sealing agents, and the like. The suitable treatment material or agent will be one compatible with the materials and processes outlined in the present disclosure.

It is contemplated that the first and second polymeric layers will be placed in overlying relationship with at least a portion of at least one of the surface regions. The polymeric layers can be applied in any suitable pattern or location to address acoustic and vibrational transmission in the associated substrate element. Because the substrate element to which the first and second polymeric layers are applied is typically a part of a larger structure, it is also contemplated that, where desired or required, the first and second polymeric layers can be applied in a configuration and manner that permits the substrate element to interact with additional components in the construct to damp acoustic or vibrational transmission in the associated construct. Thus, it is contemplated that the multi-component polymeric structure composed of at least a first polymeric layer and a second polymeric layer can function to dampen NVH in interactive relationship with the associated substrate element. It is also considered within the purview of this disclosure that the resulting configuration of the substrate element and multi-component polymeric structure can function interactively with other elements in the construct to provide the necessary damping characteristics.

The multi-component polymeric composite structure can have a suitable weight and thickness configured to achieve the desired vibrational damping of the associated substrate element. The maximum thickness of the multi-component polymeric structure will be one that meets or exceeds thickness tolerances for assembly requirements of end use products. For example, it is contemplated that in various automotive applications, the multi-component polymeric composite structure will have a composite thickness between about 12 and about 250 mils, with thicknesses between about 78 mils and 90 mils being contemplated in many vibrational damping applications. Various other embodiments can have other thicknesses. Nonlimiting examples that are contemplated in various embodiments include thicknesses in ranges such as 12 to 50 mils; 50 to 250 mils, and the like.

The multi-component polymeric composite structure will have a weight in a range between about 1 gram and about 3 grams per square inch with a weight between about 1.35 grams and about 1.53 grams per square inch being typical in many automotive applications. It is to be understood that other applications may have different weight ranges depending upon factors including end use application and acoustic challenges.

The multi-component polymeric composite disclosed herein also includes a first polymeric layer overlying at least a portion of the substrate. The first polymeric layer comprises at least one polymeric material having defined elastomeric characteristics in a Tg range between about −10° C. and 10° C. It is also within the purview of this disclosure to select a suitable polymeric material based upon other characterizations of elastomeric characteristics. One nonlimiting example would be elongation measured in terms of percent elongation as determined by Test Method ASTM D 412 or D 638. It is contemplated that materials having elongation between 10% and 100% can be employed.

The first polymeric material is in overlying contact with at least a portion of the substrate element. It is contemplated that the first polymeric material can be either in direct contact with the substrate element or can be composed of various layers therebetween. It is also contemplated that the one or more layers of material can be interposed between the first layer and the substrate surface Nonlimiting examples of layers that can be interposed in between the substrate and the first layer are polymeric materials such as adhesives. It is also contemplated that various coatings and localized treatments can be interposed between the first polymeric layer and the substrate surface as desired or required. Materials interposed will typically be those that facilitate (or at least do not impede) transmission of vibration through to the first polymeric layer preferentially over transmission through the substrate and/or materials that complement the vibration damping characteristics of the polymeric construct.

The first polymeric layer can have any suitable thickness necessary to achieve the desired vibration damping characteristics. In various applications it is contemplated that the thickness of the first polymeric layer will comprise between 10 and 50% of a two-layer construct with percentages between 6 and 32% of a two-layer polymeric construct being typical in many applications, and with first layer percentages between 12 and 18% being typical in many automotive applications. In various applications, it is contemplated that the first layer will have a weight between about 0.05 grams per square inch and 0.25 grams per square inch, with weights between about 0.100 grams per square inch and 0.150 grams per square inch being typical in certain automotive applications.

The first polymeric layer can be present as a layer of uniform thickness where desired or required. However, it is also contemplated that the thickness of the first polymeric layer can vary dimensionally over the area of the polymeric construct either randomly or due to conditions which include, but are not limited to, the surface topography of the underlying substrate and/or specific vibration dampening conditions or requirements. Where essentially uniform thickness is contemplated for the first layer, the thickness can be between about 4 and 5 mils in order to achieve suitable vibrational damping with thicknesses between about 8 and 10 mils being expected in certain applications.

The multi-component polymeric composite as disclosed herein can have any suitable configuration or geometric configuration or dimension. It is contemplated that the multi-component polymeric composite will extend and cover a sufficient area of the associated surface of the substrate to achieve the desired damping results. Without being bound to any theory, it is believed that this area will be less than the total area of the associated surface of the substrate.

In many applications, it is contemplated that at least the upper surface of the first polymeric layer of the polymeric construct will be completely covered by the second polymeric layer. Depending on the given needs and demands of the associated application, it is contemplated that the first polymeric layer will be encased by the second polymeric layer The first polymeric layer can be composed of any suitable polymeric composition that possesses or exhibits elastomeric characteristics greater than those possessed or exhibited by the polymeric composition of the second polymeric layer. This "soft" layer can be composed of one or more polymeric materials imparting a hardness in the range of 5 to 25, (as measured or determined by ASTM D2240-00).

Non-limiting examples of suitable polymeric compounds that can be employed in the first polymeric layer include various ethylene vinyl acetate copolymers, various vinyl chloride-vinyl acetate copolymers as well as various blends and alloys containing one or both of the aforementioned materials. Where the aforementioned materials are present as a blend or alloy, it is contemplated that the materials will be present in a ratio of EVA to VC-VA of 50/50. Of particular interest in certain vibration dampening applications are VC-VA materials such as various alkylenes, VC-VA terpolymeric compositions such as terpolymers, vinyl chloride, vinyl acetate and ethylene. Suitable ethylene vinyl acetate copolymers and terpolymers of vinyl chloride, vinyl acetate and ethylene are commercially available from Air Products under the trade name AIRFLEX 7200 and AIRFLEX 430.

Additional non-limiting examples of materials that can be employed in the first or "soft" polymeric layer include homopolymers of vinyl acetate, copolymers of vinyl acetate, and terpolymers of vinyl acetate, methacrylic acid polymers, polyurethane, polyurea, homopolymers of polyvinyl chloride, copolymers of polyvinyl chloride, terpolymers of polyvinyl chloride, ethylene acrylic acid polymers, and thermoplastic elastomers such as SIS, SEBS, block copolymers and radial block copolymers.

It is contemplated that the first or "soft" layer may be composed of a suitable two-component system prepared by the reactive admixture of a suitable isocyanate component with a resin or polymeric component in sufficient quantity and reactive ratio to produce tensile strength, hardness, and flexibility properties that are required for the given application. Reactive ratios of resin to isocyanate between 1:1 and 2.5:1 are contemplated with ratios of resin to isocyanate of 2:1 resin to isocyanate being contemplated in certain embodiments.

The polymeric or resin component of the reactive admixture is a polymeric material that employed to compose the backbone of the resulting composition. Non-limiting examples of suitable polymers that can be employed in the polymeric material include amine terminated polyether polyols, amine-based tetrol polyols, high functional polyols, amine terminated chain extenders, and the like.

Suitable amine-terminated polyether polyols for use in the composition employed as the "soft" component include suitable high functional polyols having a molecular weight between about 300 and 1000. Nonlimiting examples of suitable high functional polyols include polyalkylene glycols in which the terminal end-groups are predominantly secondary alcohols such as materials commercially available from Bayer under the trade name ARCOL. One nonlimiting example of such material is ARCOL-PPG-425, which is believed to be a polyether polyol. It is contemplated that the amine terminated polyether polyol portion of the resin component will constitute between 15 and 25% of the resin component.

It is contemplated that the high functional polyol can be employed in suitable admixture with suitable amine-terminated polyetheramines. It is contemplated that at least a portion of the amine-terminated polyether material employed will include compounds comprising secondary amine groups. Non-limiting examples of such materials include difunctional polyetheramines having a molecular weight between about 200 and 500 with each functionality being secondary. One example of such material is commercially available from Huntsman under the trade name SD-401.

The resin portion can also include one or more suitable monoamines. Suitable monoamines include materials prepared by the reaction of a mono-alcohol initiator with EO and/or PO followed by conversion of the resulting terminal hydroxyl groups to amines. Such materials can commonly be referred to as polyetheramines It is contemplated that the monoamines employed in the resin portion of the first layer will have a molecular weight from about 500 to about 2500, with admixtures of monoamines of differing molecular weights. In certain select embodiments, it is contemplated that the monoamine component will be a ratio of high molecular weight monoamines to low molecular weight monoamines from 1:2 to 1:4. It is contemplated that suitable low molecular weight monoamines will have an PO/EO mol ratio of 9/1, while the high molecular weight monoamines will have a PO/EO ratio of 29/6.

It is contemplated that monoamine polyetheramine materials are primarily polypropylene glycol-based can be employed advantageously in certain embodiments. Nonlimiting examples of such materials include JEFFAMINE M-600 and M-2005, respectively. Where combinations of polyetheramine materials' are employed, it is contemplated that the material will be a suitable admixture of secondary terminated monoamines and polyetheramines based on propylene glycol. The resulting resin component will contain between about 50 and 65% polyetheramine. The polyetheramine component will comprise between 30 and 45% high functional polyols include polyalkylene glycols in which the terminal end-groups are predominantly secondary alcohols; between 10 and 20% lower molecular weight polyetheramine and between 2 and 7% high molecular weight polyetheramine.

The resin component of the first layer can also include suitable secondary components such as catalysts, fillers, and the like.

It is to be understood that any fillers, filler systems, reinforcing filler systems, or the like may be used in the present invention, as desired, as long as such materials are suitable for use in the present invention as described herein. Some suitable fillers may include, but are not limited to, barium sulfate, calcium carbonate, clay, talc, aluminum silicate, titanium dioxide, nitrile rubber, butyl rubber, synthetic rubbers (e.g. styrene butadiene rubber (SBR) crumb rubber), chopped fiberglass, Wollastonite (calcium metasilicate), KEVLAR (commercially available from E.I. du Pont de Nemours Company), any suitable fibrous filler, fumed silica (also can be used as a thixotrope), and mixtures thereof.

Barium sulfate is commercially available from many sources, one of which is Hitox Corp. in Corpus Christi, Tex. under the tradename BARTEX 10. Suitable barium sulfate can also be obtained from the JM Huber Company under the tradename of HUBERBRITE B-1. Where a material such as barium sulfate is employed, it is contemplated that the material will possess an average particle size between about 1 and about 12 microns, with average particle sizes of approximately 1 micron being typical in creation applications. Such barium sulfate can be present in the resin component in amounts between 10 pbw and 30 pbw with amounts between 15 pbw and 20 bpw being typical in certain applications.

The resin component of the composition of the first layer may further include a catalyst and/or a blend of catalysts. These compounds are used to either increase or decrease the inherent reaction rate of the resin:isocyanate system. In systems where two or more polymers and chain extenders are used, the catalyst(s) may also be used to promote a specific reaction order. Nonlimiting examples of suitable catalysts include dibutyltin diacetate.

The isocyanate portion of the plural component polymeric material in the first layer can be composed of any suitable isocyanate. In various formulations, it is contemplated that medium functionality isocyanates can be employed. Suitable medium functionality isocyanates will be polymeric aliphatic diisocyanates with a functionality ranging from 2.1 to 2.4. Non-limiting examples of suitable medium functionality isocyanates that can be employed include those having a percent NCO content between 30. and 34.00, with percent NCO contents between 31 and 32 being employed in various instances. Nonlimiting examples of such materials include LUPRANATE M-10. It is believed that LUPRANATE M-10 is commercially available from BASF Corporation and is a polymeric MDI containing a relatively high level of pure MDI having a functionality of approximately 23 and an NCO content of 32 wt %.

The MDI component in the isocyanate portion can be admixed with a suitable quantity of monopolyether amine material or other suitable polymeric backbone materials to produce a suitable isocyanate blend portion for admixture with the resin component. Suitable monopolyether amines include but need not be limited to polyether amines having molecular weights between about 400 and 700. Nonlimiting examples of suitable materials include JEFFAMINE M600 commercially available from Huntsman.

It is contemplated that the isocyanate portion will be a blend of diisocyanate and monoamine in certain applications. Where such blends are contemplated, the materials may be present in a ratio of 1.0:4 to 1.0:2 monoamine to diisocyanate respectively.

The second or "hard" polymeric layer is in overlying contact with at least a portion of the first layer. Where desired or required, it is contemplated that the second or hard layer will be in direct contact with at least a portion of the first or "soft" layer. However, it is also within the purview of this disclosure that the various intermediate layers can be interposed as desired or required. The second layer will be one that functions to constrain the response of the underlying first polymeric layer when exposed to transmitted vibration. "Response to vibration" is taken to broadly include any resonance or vibration imparted or transmitted to the first layer by vibration of the substrate. In certain embodiments, it is contemplated that the second or "hard" layer can have a hardness between 75 and 95 Shore A as measured by ASTM D2240-00.

It is contemplated that the hard layer can be composed of a suitable polyurea or polyurea/polyurethane-containing polymeric material. One non-limiting example of a suitable polymeric material is that disclosed in U.S. Pat. No. 6,291,019, the specification of which is incorporated by reference herein. In various applications, it is contemplated that the polymeric composition present in the second layer can be a suitable polyurea/polyurethane hybrid of a type discussed below.

The second or "hard" layer can have any suitable thickness and weight as desired or required. It is contemplated that the second or hard layer can constitute between 10 and 90% of the multi-component polymeric construct, with quantities between 40 and 90% being typical in many situations. The thickness of the second or "hard" layer can be between 50 and 250 mils, with thicknesses between 50 and 100 mils being used in many applications and thicknesses between 70 and 80 mils being typical in certain applications.

It is contemplated that the second or "hard" layer will have a weight between about 0.05 and about 2.00 grams per square inch, with a weight between about 1.00 and 1.50 grams per inch being typical in various applications.

It is also contemplated that the material suitable for use in the second or hard layer can be a two-component system prepared from the reactive admixture of a suitable isocyanate component with a resin or polymeric component in sufficient quantity and reactive ratio to produce tensile strength, hardness and flexibility properties that are required for the given application. Reactive ratios can be between 0.50:1.00 and 1.50:1.00, with one to one ratios being contemplated in certain applications.

The polymeric component of the reactive admixture is one that can be employed to represent the backbone of the composition. It is to be understood that any suitable polymers may be used. Non-limiting examples of suitable polymers include but are not limited to amine terminated polyetherpolyols, amine based tetrol polyols, high functional polyols, amine terminated chain extenders, and the like.

Suitable amine-terminated polyether polyols suitable for use in the composition disclosed herein include amine-terminated polypropylene glycol having a molecular weight between 400 and 4000. Typical average molecular weights for suitable materials in certain applications would be in the range of 2000. Non-limiting examples of suitable materials having amine-terminated polyether polyol functionalities include JEFFAMINE D-2000 from Huntsman Polyurethanes and Polyether Amine D-2000 from BASF Corporation. It is believed that materials such as JEFFAMINE D-2000 and Polyether Amine D-2000 are difunctional primary amine polyetheramines with an average molecular weight of approximately 2000. Where desired or required, various other difunctional amines within this class can be employed in combination with the difunctional primary amine polyetheramines or in place of these materials. It is contemplated that the amount of difunctional amine employed can be between 10 and 80 pbw, with amounts between 20 and 40 pbw being utilized in specific applications in the initial formulation. In specific automotive applications, it is contemplated that the amount of difunctional amine employed can be between 10 and 20 with amounts between 15 and 18 pbw of the resin blend being utilized in specific applications.

Amine-based tetrol polyols are those characterized as tetrafunctional polyols initiated from ethylene diamine. Non-limiting examples of suitable materials will typically have a hydroxyl number in the range of 700 to 800. Suitable materials can be derived from ethylene diamine and propylene oxide or ethylene diamine and mixtures of ethylene oxide and propylene oxide. Amine-based tetrol polyols can include various polyether polyol aliphatic amine initiated tetrols present in amounts between 15 pbw and 40 pbw. In specific formulations in certain embodiments, it is contemplated that the amine-based tetrol polyols can be present in amounts between 8 pbw and 25 pbw. Non-limiting examples of such materials include VORANOL 240-700 or VORANOL 800, which are believed to be ethylene diamine and ethylene oxide/propylene oxide adduct polyols commercially available from Dow Chemical. Other useful materials include ethylene diamine propylene oxide adduct polyols available from BASF Corporation under the trade name QUADROL.

Additional tetrols that can be employed in the resin component include various pentaerythritol based or initiated glycols. Non-limiting examples of such materials include materials such as PLURACOL PEP 550 which is believed to be a secondary polyether tetrol with a hydroxyl number of 450.

High functional polyols can also be effectively employed. These materials are typically characterized as tetra or pentafunctional polyols of propylene oxide initiated from pentaerythratol or sucrose. Suitable high functional polyols can have a molecular weight in the range of 400 to 600. Without being bound to any theory, it is believed that these polyols provide for cross-linking of the polymer and resulting stiffness and hardness without embrittlement. Non-limiting examples of such materials include secondary polyether tetrols having a hydroxyl number between about 200 and about 800. Such materials include PLURACOL PEP 550, commercially available from BASF Corporation. In certain specific embodiments, it is contemplated that the secondary polyether tetrol will have a hydroxyl number between about 450 and about 550.

Additional polyols that could be employed include, but are not limited to polyoxypropylene diols, polyoxypropylene triols, polyester polyols (di, tri, quad, penta, etc. functional), polyether polyols (di, tri, quad, penta, etc. functional), and mixtures thereof. The active amine hydrogen-containing materials useful in the disclosure contained herein may be chosen from amine-terminated polyethers. Preferably the amine-terminated polyethers are selected from aminated dials or triols and, more preferably, may include a blend of aminated dials and/or trials. More preferably, the amine-terminated polyethers are selected from mixtures of high molecular weight polyols, such as mixtures of di- and trifunctional materials. However, a single high molecular weight aminated polyol can be used. It is to be understood that high molecular weight amine-terminated alkylenes and simple alkyl amines are also included within the scope of this disclosure, and may be used alone or in combination with the aforementioned amine-terminated polyols. In addition, other amine-terminated materials having different molecular weights or different chemical compositions may be used.

In certain applications it is contemplated that the amine-terminated material can be amine-terminated polyethers, including primary and secondary amine-terminated polyethers of greater than about 1,500 average molecular weight, having a functionality of from about 2 to about 6, preferably from about 2 to about 3, and an amine equivalent weight of from about 750 to about 4,000. Mixtures of amine-terminated polyethers may be used. In a preferred embodiment, the amine-terminated polyethers have an average molecular weight of at least about 2,000. These materials may be made by various methods known in the art.

Other high molecular weight amine-terminated polyethers or simply polyether amines may be used as the polymer and/or part of the polymer blend in the first component of the composition of the present invention. Particularly preferred are the JEFFAMINE® brand series of polyether amines available from Huntsman Petrochemical Corporation in Houston, Tex. This series includes JEFFAMINE® D-2000 (an amine-terminated polyoxypropylene diol of 2000 molecular weight), JEFFAMINE® D-4000, JEFFAMINE® T-3000 (an amine-terminated polyoxypropylene trial of 3000 molecular weight) JEFFAMINE® T-5000 (an amine-terminated polyoxypropylene triol of 5000 molecular weight), JEFFAMINE® T-403 (an amine-terminated polyoxypropylene triol of 400 molecular weight), and JEFFAMINE® D-230 (an amine-terminated polyoxypropylene diol of 230 molecular weight). These polyetheramines are described with particularity in Huntsman Corporation's product brochure entitled "The JEFFAMINE® Polyoxyalkyleneamines." The JEFFAMINES are amine-terminated polyoxypropylenes, the "D" designates a diamine, the "T" designates a triamine, and the number extension designates the molecular weight.

Other polymer materials suitable for use in the first or resin component of this composition include at least one of the following: VORANOL 230-660 triol is a polyether polyol commercially available from Dow Chemical Company in Midland, Mich.; VORANOL 230-660, having average molecular weight of 250; a typical hydroxyl number of 660; a functionality of 3; an average hydroxyl content of 20.0%; and a maximum water content of 0.05%; VORANOL 220-056 diol is a polyether polyol commercially available from Dow Chemical Company in Midland, Mich.; VORANOL 220-056, having average molecular weight of 2000, a typical hydroxyl number of 56, a functionality of 2.0, an average hydroxyl content of 1.70% and a maximum water content of 0.06%. Ethylene glycol may successfully be used, as may polypropylene glycol (PPG) having an average molecular weight of about 2000. One suitable PPG-2000 product is commercially available from Huntsman Corporation under the trade name JEFFOX® PPG-2000. POLY-G 55-173 is a polyether diol commercially available from Lyondell Chemical in Newtown Square, Pa. More specifically, POLY-G 55-173 is a hydroxyl terminated poly(oxyalkylene) polyol, THANOL® SF-5505 is a 5500 molecular weight polyether triol containing approximately 80% primary hydroxyl groups, commercially available from Bayer Material Science, Pittsburgh Pa. 1,4-Butane diol may also be used, and one such suitable compound is commercially available from Lyondell Chemical under the tradename 1,4-BDO. BASF in Mount Olive, N.J. also supplies a suitable 1,4-Butane diol.

It is to be understood that the polymer(s) of the first (resin) component of the composition may be present in any amount sufficient to achieve desired degrees of the characteristics mentioned hereinabove. These compounds contribute to the amount of cross-link density imparted to the composition, as well as to the amount of rigidity or softness imparted to the composition. However, in the preferred embodiment, these may comprise between about 0 wt. % and about 100 wt. % of the first component of the composition, with ranges between 80 and 95% potentially being useful in more precise applications.

The resin component of the composition of the second layer may further optionally include a chain extender and/or a blend of chain extenders present in an amount sufficient to impart a predetermined amount of tensile strength, weatherability, flexibility, adhesion to specific substrates, and hardness to the overall system. Where employed, the chain extender component can be present in an amount between 1 and 20 pbw, with amounts between 5 and 11 pbw being present in certain applications. It is believed that the chain extender(s) may also adjust the reaction rates of the overall system. Amine-terminated chain extenders can be characterized as diamines that are either primary or secondary in nature. These can either be aromatic or aliphatic-based resins.

Suitable chain extenders are selected from the group consisting of dialkyl substituted methylene dianiline, diethyltoluene diamine, substituted toluene diamines, and mixtures thereof. Other suitable chain extenders may include amine terminated aliphatic chain extenders selected from (but not limited to) the group consisting of cyclohexane diamine, isophorone diamine, and mixtures thereof. Other suitable chain extenders may include low molecular weight glycol type chain extenders, such as, for example, 1,4-butane diol. Non-limiting examples of primary aromatic amines are ETHA-CURE 100 (DETDA: Diethyl toluene diamine), and ETHA-CURE 300 (DMTDA:Dimethyl thiotoluene diamine) from Albemarle Corporation. Non-limiting examples of secondary aromatic diamines include UNILINK 4200 (N,N'-(sec-butyl) Methylene dianilene) commercially available from Dorf Ketal or POLYLINK 4200 from the Hanson Group.

It is also contemplated that secondary aliphatic amines may be used as chain extenders. These include cyclic or linear molecules. Examples include POLYCLEAR 136, acrylonitrile-modified isophorone diamine (commercially available from BASF Corporation), JEFFLINK 754 (acetone modified isophorone diamine) from Huntsman Corporation, CLEAR-LINK 100 from Dorf Ketal, SD-10(N,N'-di(3,3-dimethyl-2-butyl)-1,6 diaminohexane)) from Albemarle Corporation.

The resin component may further optionally consist essentially of a filler and/or blend of fillers present in an amount sufficient to impart a predetermined amount of hardness, flexibility, and specific noise, vibration and harshness blocking characteristics to the after-application cured surface.

It is to be understood that any fillers, filler systems, reinforcing filler systems, or the like may be used in the present invention, as desired, as long as such materials are suitable for use in the present invention as described herein. Some suitable fillers may include, but are not limited to, barium sulfate, calcium carbonate, clay, talc, aluminum silicate, titanium dioxide, nitrile rubber, butyl rubber, synthetic rubbers (eg. styrene butadiene rubber (SBR) crumb rubber), chopped fiberglass, Wollastonite (calcium metasilicate), KEVLAR (commercially available from E.I. du Pont de Nemours Company), any suitable fibrous filler, fumed silica (also can be used as a thixotrope), and mixtures thereof.

Barium sulfate is commercially available from many sources, one of which is Hitox Corp. in Corpus Christi, Tex. under the tradename BARTEX 10. Suitable barium sulfate can also be obtained from the JM Huber Company under the tradename of HUBERBRITE B-1. Where a material such as barium sulfate is employed, it is contemplated that the material will posses an average particle size between about 1 and about 12 microns with average particle sizes of approximately 1 micron being typical in creation applications. Such barium sulfate can be present in the resin component in amounts between about 10 pbw and 30 pbw with amounts between 15 pbw and 20 pbw being typical in certain applications.

A suitable synthetic crumb rubber is commercially available under the tradename 1006 CRUMB from Ameripol Synpol Corp. in Akron, Ohio. Some properties of the 1006 CRUMB include the following: 1006 CRUMB, which is a light-colored polymer and is in free flowing crumb form, eliminating the need for milling, cutting or grinding. The crumb particles retain the porous nature of the coagulated rubber and can be dissolved in a solvent faster than milled or pelletized bale rubber. The crumb size, retained on ¼" screen, is 1.0% max; less than 16 mesh is 28.0% max.

One suitable fumed silica is commercially available under the trade name CAB-O-SIL M-5 UNTREATED FUMED SILICA from Cabot Corporation in Billerica, Mass. The CAB-O-SIL M-5 has a pH (4% slurry) of 3.7-4.3; a 325 mesh residue (44 microns) of 0.02 max %; a specific gravity of 2.2 g/cm$^3$; an assay (% SiO$_2$) greater than 99.8; and an average particle (aggregate) length of 0.2-0.3 microns.

The fillers may increase impact resistance and tensile strength. These compounds may also be used in the composition to modify hardness, flexibility and to provide specific noise and vibration blocking characteristics.

Filler(s) may range between about 0 wt. % and about 55 wt. %, with ranges between about 0 wt. % and about 36 wt. % of the first component of the composition being contemplated. In certain specific compositions, it is contemplated that filler (s) can be present in an amount between about 5% by weight and about 10% by weight.

The first (resin) component of the composition disclosed herein may further optionally consist essentially of any suitable colorants, pigments, or the like, as desired. Some non-limitative examples of such materials are selected from the group consisting of carbon black, titanium dioxide, iron oxide (a suitable iron oxide is commercially available under the tradename RED OXIDE from Harcros Chemicals, Inc. in Kansas City, Kans.), organic pigments and dyes, and mixtures thereof. These compounds are used primarily to impart a specific color to the composition. However, in some instances, carbon black and titanium dioxide, for example, may also affect the hardness of the system.

The first (resin) component of the composition may further optionally consist essentially of a catalyst and/or a blend of catalysts. These compounds are used to either increase or decrease the inherent reaction rate of the resin:isocyanate system. In systems where two or more polymers and chain extenders are used, the catalyst(s) may also be used to promote a specific reaction order.

The second component of the composition employed in the hard layer is an isocyanate material. It is to be understood that any suitable isocyanate may be used. Both aromatic and aliphatic isocyanates can be used in the composition disclosed herein. Non-limiting examples of suitable aliphatic isocyanates can include the aliphatic isocyanates of the type described in U.S. Pat. No. 5,162,388, which is incorporated herein by reference. Accordingly, these are typically aliphatic diisocyanates and, more particularly, are the bifunctional monomers of the tetraalkyl xylene diisocyanate, such as the tetramethyl xylene diisocyanate, or the trimerized or the biuret form of an aliphatic diisocyanate, such as hexamethylene diisocyanate. Also, cyclohexane diisocyanate and isophorone diisocyanate can be considered useful aliphatic isocyanates. Other useful aliphatic polyisocyanates are described in U.S. Pat. No. 4,705,814, which is incorporated herein by reference. It is to be understood that the aforementioned isocyanates may be used alone or in combination.

In various applications it is contemplated that the isocyanate component of the second or "hard" layer can have an isocyanate functionality of at least medium to high functionality. In such situations, it is contemplated that the isocyanate component can be present in reactive index amount between 1.05 and 1.50. The isocyanate component can be present in an amount between 0.5 pbw and 2.0 pbw with amounts between 1.0 pbw and 1.25 pbw being typical in certain applications.

It is contemplated that medium functionality isocyanates can be formulated prepolymers based upon methyl diisocynate and polyetherpolyols with functionality ranging from 2.2 to 2.3. Non-limiting examples of suitable medium functionality isocyanates include materials having a percent NCO between about 24 and 26. Non-limiting examples of such materials include RUBINATE 7500 commercially available from Huntsman Polyurethanes. It is believed that RUBINATE 7500 is a methylene diphenyl diisocyanate prepolymer with a functionality of 2.29 and a percent NCO of 25.1.

High functionality isocyanates can be based upon polymeric methylene diisocyanates modified to provide functionalities of 2.90 to 3.0 and percent NCO between 20 and 35%, with percentages between 22% and 32% being employed in certain situations. Non-limiting examples of such materials include RUBINATE 9257 and SUPRASEC 9582 commercially available from Huntsman Polyurethanes. It s believed that RUBINATE 9257 is a polymeric methylene diphenyl diisocyanate modified to provide a functionality of 2.9 and a percent NCO of 30.1.

Where desired or required, the isocyanate component can be a blend of high and medium functionality isocyanates. Where blended, it is contemplated that the medium functionality isocyanate is blended with the high functionality isocyanate to provide for a balanced reaction system, ease of system processability, and optimum physical properties including high tensile strength, high stiffness without associated brittleness, and good elastomeric qualities. In various situations, it is contemplated that this blend of medium functionality isocyanate to high functionality isocyanate is in a range of 1:2:1 respectively. In certain instances, it is believed that a blend ratio of 2 parts medium functionality isocyanate to 3 parts high functionality isocyanate can be effectively employed in certain applications. By way of non-limiting example, where RUBINATE 7500 and RUBINATE 9257 are employed, it is contemplated that these materials can be employed in a ratio between about 0.5:1 and 2.0:1.0, with ratios of 1:1 being contemplated in certain applications.

One non-limiting example of aromatic polyisocyanate is methylene bis(4-phenylisocyanate) or "MDI." Pure MDI, quasi-prepolymers of MDI, and modified pure MDI, etc., are useful. Materials of this type may be used to prepare suitable elastomers. Since pure MDI is a solid and, thus, inconvenient to use, liquid products based on MDI are also disclosed as suitable for use in the present invention. For example, U.S. Pat. No. 3,394,164, which is incorporated herein by reference, describes a liquid MDI product. More generally, uretonimine modified pure MDI is also included. This product is made by heating pure distilled MDI in the presence of a catalyst. Examples of commercial materials of this type are ISONATE® 125M (pure MDI), ISONATE® 2143L (a liquid uretonimine-modified methylenediisocyanate product), RUBINATE® 1680 (a liquid uretonimine-modified methylenediisocyanate product), RUBINATE® 1209, RUBINATE® 9009 (an aromatic isocyanate quasi-prepolymer), RUBINATE® 9015 (an aromatic isocyanate quasi-prepolymer), and RUBINATE® M ("liquid" MDI's). The ISONATE® products are available from Dow Chemical Co. in Midland, Mich., and the RUBINATE® products are available from Huntsman Polyurethanes located in West Deptford, N.J. Preferably, the amount of isocyanate used to produce the present polyurea elastomers is equal to or greater than the stoichiometric amount based on the active hydrogen ingredients in the formulation.

It is understood that the term "isocyanate" also includes quasi-prepolymers of isocyanates with active hydrogen-containing materials. The active hydrogen-containing materials used to prepare a prepolymer can include a polyol or a high molecular weight amine-terminated polyether, also described herein as amine terminated alkylenes, or a combination of these materials. The amine-terminated polyethers useful in preparing quasi-prepolymers of isocyanates include the same amine-terminated polyethers described hereinabove as amine-terminated materials for producing polyureas.

The polyols useful in preparing a quasi-prepolymer include polyether polyols, polyester diols, triols, etc., having an equivalent weight of at least 500, and preferably of at least about 1,000 to about 5,000. Those polyether polyols based on trihydric initiators of about 4,000 molecular weight and above are especially preferred. The polyethers may be prepared from ethylene oxide, propylene oxide, butylene oxide or a mixture of propylene oxide, butylene oxide and/or ethylene oxide. Other high molecular weight polyols that may be useful in this invention are polyesters of hydroxyl-terminated rubbers, e.g., hydroxyl terminated polybutadiene. Quasi-prepolymers prepared from hydroxyl-terminated polyols and isocyanates are generally reserved for use with aromatic polyurea elastomer systems.

The isocyanate and resin component can be formulated to provide an index of 1.05 to 1.20 with indexes of 1.10 to 1.15 being applicable in certain applications. It is contemplated that these components can be mixed either using high pressure impingement mixed spray equipment or low pressure static-mixed extrusion techniques.

The multi-component polymeric construct can be applied to the desired substrate in any suitable manner, including, but not limited to, multi-component application techniques. It is contemplated that the first and second polymeric layers can be applied to the substrate element in a sequential manner using suitable spray and/or hot melt application techniques, including, but not limited to extrusion. In certain application techniques it is contemplated that the first layer material can be prepared by melt admixing of the various components at a suitable temperature and under suitable mixing conditions to achieve the desired first polymeric material composition. The material can be applied to at least one surface region by any suitable application technique. It is contemplated that the material of the first polymeric layer will be applied in a liquid or semi liquid state and will solidify completely after application. Solidification may be due in whole or in part to temperature decrease or may be due to cross-linkage formation depending upon the type and nature of the polymeric composition.

Application of the second polymeric layer can also be accomplished by any suitable method such methods include, but are not limited to, application using a conventional two-component applicator system, accommodating the first component and the second component of the second polymeric composition as disclosed herein.

The resulting device comprises a substrate element with a multi-component polymeric construction affixed to at least one surface region. The multi-component polymeric construction comprises at least two polymeric layers with a first layer positioned in overlying relationship to the surface region and a second layer in overlying relationship to the first layer in a manner. The multi-component polymeric construction is configured to attenuate vibration of the substrate element. The vibration attenuated can be one associated with noise, vibration and harshness.

To further illustrate the present invention, the following examples are given. It is to be understood that these examples are provided for illustrative purposes and are not to be construed as limiting the scope of the present invention.

Example I

A polymeric composition for use as a material for the first polymeric layer was prepared according to the present disclosure by melt mixing the following components:

| TRADENAME | QUANTITY (solidified) | PERCENT SOLIDS (liquid) |
|---|---|---|
| AIRFLEX 7200 | 58 pbw | 72 |
| AIRFLEX 430 | 42 pbw | 52 |

The resulting material is a thermoplastic polymeric material having a Tg of 0 degrees C. that is applied with a film like consistency when dispensed from a slot extruder.

Example II

A polymeric composition for use as a material for the second polymeric layer was prepared according to the present disclosure in the following manner. The following compounds in the stated weight percentages were admixed to form the resin component:

| TRADENAME | QUANTITY | PERCENT SOLIDS |
|---|---|---|
| JEFFAMINE D-2000 | 26.3 pbw | 100 |
| VORANOL 800 | 19.8 pbw | 100 |
| PLURACOL PEP 550 | 36.9 pbw | 100 |
| ETHACURE 100 | 6.6 pbw | 100 |
| HUBERBRITE B-1 | 10.4 pbw | 100 |

The resultant composition was a liquid material under ambient conditions and had a viscosity suitable for extrusion processes.

The second component of the composition of the present invention comprises a liquid isocyanate composition comprised of 50 wt. % RUBINATE 7500 and 50 wt. % RUBINATE 9257 and has a viscosity under ambient conditions suitable for extrusion processes.

Example III

A composition as prepared in Example II was placed in a suitable two component extrusion device, the first component being placed in a first suitable vessel, and the second component being placed in a second suitable vessel. A test substrate panel was prepared and a portion of the two component composition was applied to the substrate by extrusion. After application, the applied liquid composition was allowed to cure on the test substrate panel in a time interval between about 15 seconds and 20 seconds. After curing, the composition leaves a substantially smooth finish.

Example IV

A series of test panels were prepared in order to evaluate the effect of the multi-component polymeric composite on transmissiveness to vibrations contributing to noise, vibration and harshness. The test panels were 4"×12"×0.032" ACT cold rolled steel panels with a hole on one end. At the hole end a line at $^{13}/_{16}$" was drawn using a ruler to demark a clamp point for further testing purposes.

Again using a ruler, at 1⅝" from the edge of the hole end, a cross was made in the center to define where the modally tuned hammer hits the panel. This height was chosen after testing showed that, when struck with the hammer, the panel was excited with about the same amount of energy throughout the frequency range measured. The accelerometer was placed at other end of the panel. Here a second panel was reversed so that the hole ends are opposite. The panels' edges were lined up and a circle was drawn using the hole as a guide in order to get consistent placement of the accelerometer from test substrate to test substrate.

On the other side of the panel, a line was made at ⅞" from the edge of the hole end. This region was the only part of the panel that is not coated. This is for clamping consistency, since different damping materials will have different stiffnesses. The resulting panel looked like the diagram depicted in FIG. 1.

Example V

Test panels prepared according to the method outlined in Example IV were coated on one surface with a first layer of a polymeric composition prepared according to the procedure outlined in Example I to a thickness of 8-10 mils. The material had an average weight of 0.135 grams per square inch. After the material had hardened, the test panels were coated with a second polymeric composition prepared according to the method outlined in Example II at a thickness of 70-80 mils. The material of the second layer had an average weight of 1.21 grams per square inch. Visual observation and empirical observation has indicated that the second layer is harder and appears to constrain the more elastomeric first layer with a Tg greater than 0 C.

Example VI

Figure 2:
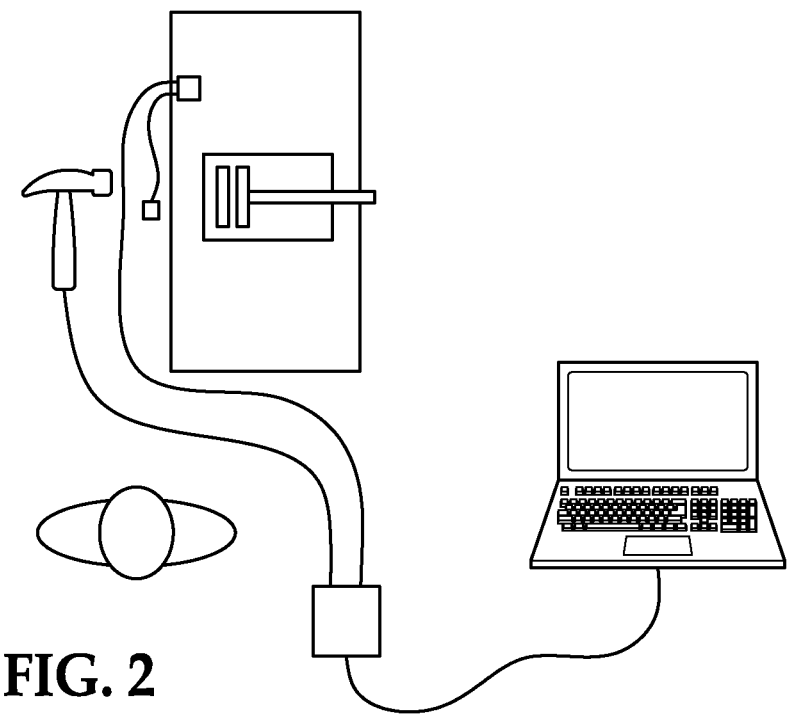
FIG. 2 is a plan view of a attest device as disclosed herein.

A test method was developed for quantifying vibration response. The test equipment 10 set up is depicted in FIG. 2 and includes an output interface converter in electronic communication with a suitable computer 13. Interface 12 is electronically linked to accelerometer 14 associated with an acoustically inert base such as wood block 16. A vise 18 mounted on the block 16 is configured to releasably hold test panels in clamped engagement. Once the test equipment was turned on, the system was allowed to warm up for 20 minutes. Each panel was placed in the clamp 20 located in vise 18 to the marked clamp line and the clamp was tightened. The accelerometer 14 was attached with bees wax to the circle marked on the panel as described previously.

An excitation force is provided on the respective test panels by striking the test panel at the defined location with a hammer 22 modified with a calibrated transducer. When the hammer hits the panel, it sends an analog signal to the analog to digital converter (ADC). This signal is collected in the time domain by the ADC and converted to a digital signal and sent to the software in the computer. The computer software translates this time domain signal into a frequency domain signal using a fast Fourier transform (FFT) mathematical algorithm. The software displays the time domain and frequency domain. In the time domain graph, the force of the hit can be seen. In various configurations, it is contemplated that the force be maintained at a level under 3 lbs to insure a linear system in order to provide reproducible results. In the frequency domain, the graph shows the energy of the input over the frequency range of interest.

In an ideal system, the frequency domain graph for the hammer will show a straight horizontal line indicating no vibrational spikes. For purposes of analysis, it is contemplated that an excitation force that stays within 10 dB throughout the frequency range of interest is considered close enough to linear and acceptable performance. For purposes of the present analysis the frequency range of interest is considered to be between 0 and 500 Hz.

When the hammer excites the panel, the introduced mechanical energy vibrates the panel. The vibrations of the panels are known as modes. Modes can be bending or twisting shapes of the panels. The accelerometer is also a transducer, and it measures these vibrations or accelerations of the panel and converts them into an analog signal. This analog signal is collected and converted to a digital signal by the ADC, which then sends the digital signal to the software. This software takes the digital signal and uses the necessary algorithms to produce a frequency response of the panel. The frequency response graph of the panels shows the magnitude of the vibration on the y-axis and the frequency on the x-axis. The peaks shown in the graph are resonant frequencies of the panel. Resonant frequencies correspond to the modes of the panel. When damping is applied to the panel, the resonant frequencies may shift, and the area under the curve will be reduced.

Example VII

Test panels prepared according to the method outlined in Example V were compared to untreated test panels prepared according to the method outlined in Example IV according to the method that follows.

Figure 3:
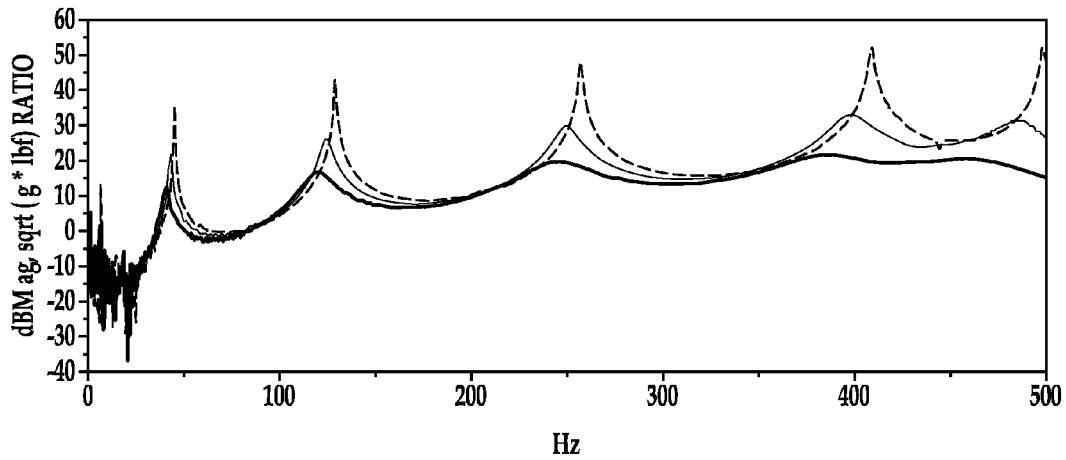
FIG. 3 is a graphic depiction of damping characteristics of various coating compositions.

A blank test panel prepared according to the method outlined in Example IV was tested by the method outlined in Example VI. Also tested was a test panel prepared according to the method outlined in Example V. The following figure shows a FFT response for a blank panel, the panel with two different coatings attached. One coating is a generic automotive liquid applied sound deadener (LASD) and the other is the material from Example 5. The resulting data is collected in FIG. 3.

Example VIII

In order to further assess the effectiveness of various materials in damping vibration, test samples prepared using the materials outlined in Example V and were tested using the Oberst test method as described in ASTM E-756. Steel test beams having dimensions of 0.5"×11.5"×0.030" as outlined in the Oberst test method were commercially obtained and were base-lined to determine the resonant frequencies over a temperature range between −50 degrees F. and 200 degrees F.

Figure 4:
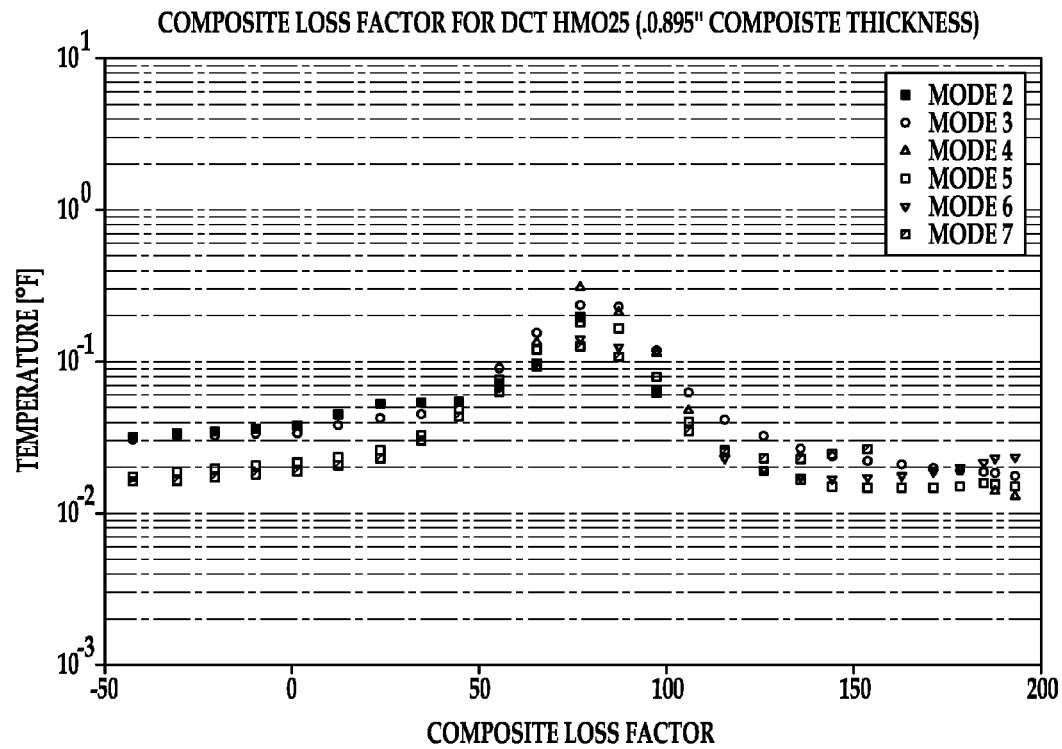
FIG. 4 is a graphic depiction of oberst testing.

Oberst test bars were then coated with a viscoelastic layer at a thickness of 8-10 mils of a hot melt composition containing 58 pbw AIRFLEX 7200 (vinyl acetate-ethylene copolymer) and 42 pbw AIRFLEX 430 (vinyl chloride-vinyl acetate ethylene terpolymer). The material was applied at a temperature of 90° F. After the viscoelastic layer has cooled, a layer of between 70 and 80 mils of the composition set forth in Example V. was applied in overlying relationship with the previously applied layer so that the resulting composite covers 0.5"×10" of the bare beam. The resulting samples were allowed to sit for approximately 24 hours and were then sanded to ensure an even outer surface for the outer constraining layer. The samples were then allowed to cure for one week after which the samples were tested. The results in the graph are depicted at FIG. 4.

Example IX

A polymeric composition for use as a material for the first polymeric layer was prepared according to the present disclosure by reactive admixture of a resin component and an isocyanate component in a ratio of two parts resin component to one part isocyanate component. The following compounds in the stated weight percentages were admixed to form the resin component:

| TRADENAME | QUANTITY | PERCENT SOLIDS |
|---|---|---|
| ARNOL PPG 425 | 21.2 pbw | 100 |
| JEFFAMINE SD 401 | 39.45 pbw | 100 |
| JEFFAMINE M600 | 14.08 pbw | 100 |
| JEFFAMINE M2005 | 4.67 pbw | 100 |
| HUBERBRITE B-1 | 20.9 pbw | 100 |
| DBTDA | 0.195 | 100 |

The following components were admixed in the following proportions to form the isocyanate component with the LUPRANATE material being warmed to a temperature between 30 and 40 C prior to mixture.

| TRADENAME | QUANTITY | PERCENT SOLIDS |
|---|---|---|
| JEFFAMINE M600 | 33.8 pbw | 100 |
| LUPRANATE M-10 | 116.2 pbw | 100 |

The two components were admixed and applied to the substrate described in Example III. And overlaid with a second or constraining layer as defined in Example II. The resulting constructions were tested and found to provide NVH damping characteristics when tested.

Example X

In order to further assess the effectiveness of various materials in damping vibration, test samples are prepared using the materials outlined in Example IX and are tested using the Oberst test method as described in ASTM E-756. Steel test beams having dimensions of 0.5"×11.5"×0.030" as outlined in the Oberst test method are commercially obtained and were base-lined to determine the resonant frequencies over a temperature range between −50 degrees F. and 200 degrees F.

Oberst test bars are then coated with a viscoelastic layer at a thickness of 8-10 mils of a two-part composition as outlined in Example IX. The material is applied at a temperature of 90° F. After the viscoelastic layer has cooled, a layer of between 70 and 80 mils of the composition set forth in Example IX. is applied in overlying relationship with the previously applied layer so that the resulting composite covers 0.5"×10" of the bare beam. The resulting samples are allowed to sit for approximately 24 hours and are then sanded to ensure an even outer surface for the outer constraining layer. The samples are then allowed to cure for one week after which the samples are tested. The results are constisant or exceed those outlined in Example VIII.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A construction configured to dampen vibration transmission, the construction comprising:
   a solid substrate element configured to transmit an associated vibration in at least one frequency range;
   a first polymeric layer overlying at least a portion of the substrate element, the first polymeric layer comprising at least one polymeric material having elastomeric characteristics in a Tg range between +10 to −10° C. and a hardness of between 5 and 25 as measured with Shore A methodology, wherein the polymeric material of the first layer is composed of polymers resulting from reactive admixture of isocyanate and at least one of amine-terminated polyether polyols, amine-based tetrol polyols, polyetheramines having a molecular weight between 500 and 2500, and high functional polyols having a molecular weight between 300 and 1000;
   a second polymeric layer in outermost overlying direct contact to at least a portion of the first polymeric layer at a location opposed to the substrate, wherein the second polymeric layer exhibits greater rigidity than the first polymeric layer and wherein the second polymeric layer is composed of at least one polymeric material that possesses lower elastomeric characteristics than the polymeric material present in the first polymeric layer, wherein the polymeric material of the second layer is a polyurea polymeric compound formed from a first component that consists essentially of a polymer and/or a blend of polymers present in an amount sufficient to impart a predetermined amount of tensile strength, hardness, and flexibility and a second component composed of an isocyanate quasi-prepolymer based on modified MDI and high molecular weight polyether polyol having an isocyanate content between about 10 and 60% and a 2,4 prime-isomer content of less than 10%.

2. The construct of claim 1 wherein the substrate is composed of at least one of the following: metal, structural polymeric materials, carbon graphite composites, fiberglass, polycarbonates, or ABS.

3. A multi-component polymeric structure for reducing NVH transmissive characteristics on a solid substrate comprising:
   in layered relationship, at least one first polymeric layer having at least one component exhibiting enhanced elastomeric qualities; and at least one second polymeric layer, the second polymeric layer composed of a polymeric substance containing at least one polyurea component exhibiting elastomeric characteristics lower than those of the first layer, and wherein the first polymeric layer is configured to be interposed between the substrate and the second polymeric layer, and the second layer is in outermost relationship relative to the structure, wherein the first layer is located proximate to the substrate, the first layer having elastomeric characteristics in a Tg range between +10 to −10° C. and a hardness of between 5 and 25 as measured with Shore A methodology and wherein the second layer is in overlying relationship to the first layer wherein the second polymeric layer exhibits greater rigidity than the first polymeric layer and wherein the second polymeric layer is composed of at least one polymeric material that possesses lower elastomeric characteristics than the polymeric material present in the first polymeric layer, wherein the polymeric material of the first layer is composed of polymers resulting from the reactive admixture of isocyanate and at least one of amine-terminated polyether polyols, amine-based tetrol polyols, polyetheramines having a molecular weight between 500 and 2500, and high functional polyols having a molecular weight between 300 and 1000, the polymeric material of the second layer is a polymeric compound formed from a first component that consists essentially of a polymer and/or a blend of polymers present in an amount sufficient to impart a predetermined amount of tensile strength, hardness, and flexibility, a second component composed of an isocyanate quasi-prepolymer based on modified MDI and high molecular weight polyether polyol having an isocyanate content between about 10 and 60% and a 2,4 prime-isomer content of less than 10%.

4. The multi-component polymeric structure of claim 3 wherein the isocyanate content is between about 22% and 32%.

5. An automotive component comprising:
   at least one substrate component composed of at least one of the following: metal, structural polymeric materials, carbon graphite composites, fiberglass, polycarbonates, ABS;
   a multi-component polymeric composite structure in direct overlying relationship with the substrate, the composite structure having a thickness between 12 and 250 mils, the multi-component polymeric structure consists of:
      an inner polymeric layer that comprises between 10 and 50% of the thickness of the multi-component polymeric composite, the inner layer in direct contact with the substrate, the inner polymeric layer composed of at least one polymeric material having elastomeric characteristics in a Tg range between +10 to −10° C. and a hardness of between 5 and 25 as measured with Shore A methodology wherein the polymeric material of the inner layer is composed of polymers resulting from reactive admixture of isocyanate and at least one of amine-terminated polyether polyols, amine-based tetrol polyols, polyetheramines having a molecular weight between 500 and 2500, and high functional polyols having a molecular weight between 300 and 1000;
      an outer polymeric layer in direct overlying relationship to the inner polymeric layer, the outer polymeric layer composed of a polymeric compound formed from a first component that consists essentially of a polymer and/or a blend of polymers present in an amount sufficient to impart a predetermined amount of tensile strength, hardness, and flexibility, a second component composed of an isocyanate quasi-prepolymer based on modified MDI and high molecular weight polyether polyol having an isocyanate content between about 10 and 60% and a 2,4 prime-isomer content of less than 10% that has been cured in place on the inner polymeric layer.

* * * * *